US006831382B1

(12) United States Patent
Lyle et al.

(10) Patent No.: US 6,831,382 B1
(45) Date of Patent: Dec. 14, 2004

(54) COVER FOR ELECTRIC MOTOR

(75) Inventors: David M. Lyle, O'Fallon, MO (US); Timothy J. Druhe, Granite City, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/802,490

(22) Filed: Mar. 17, 2004

(51) Int. Cl.[7] .................................................. H02K 5/00

(52) U.S. Cl. ............................ 310/89; 310/86; 310/42; 310/58; 310/68 R; 310/71

(58) Field of Search ............................ 310/89, 68, 42, 310/58, 68 R, 71

(56) References Cited

U.S. PATENT DOCUMENTS 4,593,163 A 6/1986 Fisher
4,716,326 A 12/1987 Fisher
4,858,303 A 8/1989 Fisher
5,006,743 A 4/1991 King et al.
5,245,237 A * 9/1993 Fisher ......................... 310/89
5,278,469 A * 1/1994 Weber ......................... 310/89
5,861,689 A * 1/1999 Snider ......................... 310/71
6,472,785 B2 * 10/2002 Petit ............................ 310/71
6,559,566 B2 * 5/2003 Modi ........................... 310/89
6,657,338 B2 * 12/2003 Fisher ......................... 310/89

OTHER PUBLICATIONS

A.O. Smith Electrical Products Company, Century Flex–48 Pool & Spa Assembly, Drawing and Four (4) photographs, undated.

Five (5) photographs of cover for motor, undated, made by A.O. Smith Electrical Products Company.

* cited by examiner

*Primary Examiner*—Thomas M. Dougherty
*Assistant Examiner*—Iraj A. Mohandesi
(74) *Attorney, Agent, or Firm*—Harness, Dickey & Pierce, P.L.C.

(57) ABSTRACT

An electric motor having a cover which is removably mounted to an endshield of the motor and defines an enclosure for electronic components. The cover has an overlapping fit against a wall of the endshield to prevent entry of moisture or contaminants into the enclosure. The cover provides unhindered access to fasteners for connecting the motor to an adjacent part, such as a pump, so that the cover may remain mounted on the endshield while the motor is attached to the pump. Indentations in the cover are positioned at the fasteners, and corresponding recesses are provided in the wall of the endshield.

17 Claims, 5 Drawing Sheets

COVER FOR ELECTRIC MOTOR

BACKGROUND OF THE INVENTION

This invention relates generally to dynamoelectric machines, and in particular to a cover which is removably mounted to an endshield of a motor and which simultaneously seals against the endshield and provides unhindered access to fasteners for connecting the machine to an adjacent part, such as a pump.

Dynamoelectric machines such as electric motors have widespread use in converting energy between electrical current and mechanical motion. A substantial concern is that motors are frequently exposed to contaminants such as moisture and dust which damage or degrade the motors. Electrical component parts used in control and operation of the motors are particularly vulnerable to damage from water, which can produce short-circuits and safety hazards. Consequently, electronic components are mounted at locations where they may be protected from environmental contamination. For example, a motor for an above-the-ground swimming pool filter pump is typically placed outdoors, adjacent to the pool, where it is exposed to both rain and splashes. The motor has an electric power cord with wires that connect at a terminal board holding electronic components. The terminal board is mounted inside the motor behind a sealed cover to prevent moisture from reaching the terminal board or its components, thereby lowering the risk of contamination. Typically, the cover includes a steel plate and gasket which are mounted to an endshield of the motor using two or more small threaded fasteners. Unfortunately, removal and replacement of that cover increases the time required to access the terminal board for assembly or maintenance, thereby degrading efficiency.

Some motors have a dome-type cover which encloses a portion of the endshield, but these covers have the drawback of requiring additional installation time during assembly. Either they fail to provide an effective seal so that a second, steel plate cover is still required, or alternatively they obstruct access to bolt fasteners used in connecting the motor to an adjacent part, such as a pump or support. In the latter instance, the dome-type cover must be removed for manipulating the bolt fasteners even though there is no need to access the terminal board or electronic components. That exposes the electronics to potential contamination during the time when the cover is removed. More importantly, a person may inadvertently damage electronic components when removing or re-installing the cover, or may inadvertently re-install the cover at an unsealing, mis-aligned orientation, causing subsequent leaks and damage.

SUMMARY OF THE INVENTION

Among the several objects and features of the present invention may be noted the provision of a dynamoelectric machine which is connectable to an adjacent part while being simultaneously protected from moisture or contaminants; the provision of such a machine which reduces the time required for connection to the adjacent part; the provision of such a machine which has an effective seal; the provision of such a machine which provides unhindered access to fasteners; the provision of such a machine which reduces risk of damage to electronic components; and the provision of such a machine which is economical.

In general, a dynamoelectric machine of the present invention is connectable to an adjacent part while being simultaneously protected from moisture or contaminants.

The machine comprises a casing having a hollow interior defining a housing and a longitudinal axis. An endshield is positioned generally at an end of the casing and mounts at least one electrical component used in operation of the machine. The endshield has a wall projecting in a longitudinal direction and further has at least two openings for receiving fasteners to connect the machine to the adjacent part. The at least two openings define respective fastening locations on the endshield. A cover is removably mounted on the endshield and defines an enclosure to protect the at least one electrical component. The cover is configured for an overlapping fit with at least a portion of the wall of the endshield to prevent passage of moisture or contaminants into the enclosure. The cover is further configured to avoid covering the at least two openings when mounted on the endshield such that the fastener locations lie outside of the enclosure and are accessible for connecting the machine to the adjacent part while the cover remains mounted on the endshield.

In another aspect, a method according to the present invention protects a dynamoelectric machine from moisture or contaminants while connecting the machine to an adjacent part. The machine has a casing, two opposite endshields, and at least two fasteners connecting the endshields and extending beyond the casing for connection to the adjacent part. The method comprises the steps of mounting a cover on a portion of one of the endshields with a fit which overlaps a sidewall of the endshield to prevent passage of moisture or contaminants. The cover is configured to avoid covering the fasteners. The fasteners are manipulated to connect the machine to the adjacent part while the cover remains mounted on the endshield.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Figure 1:
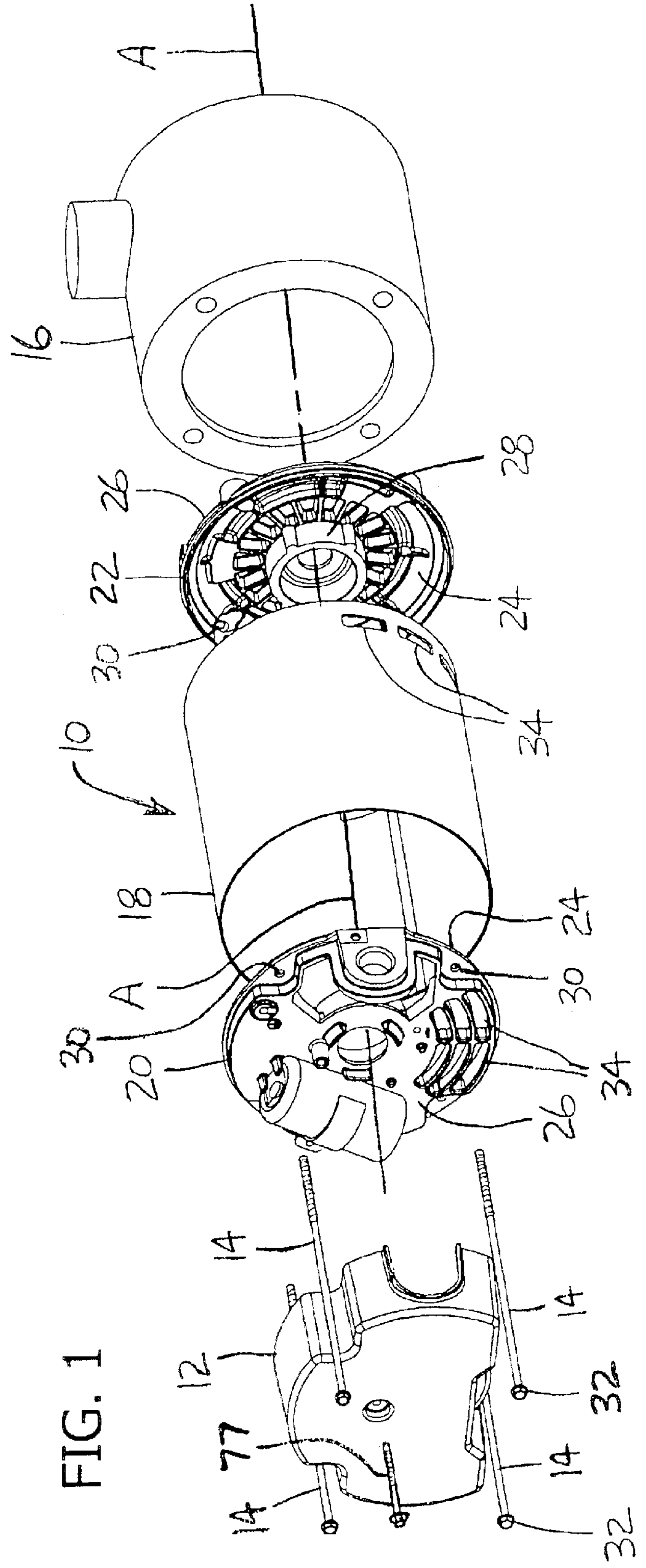
FIG. 1 is a schematic, exploded perspective of an electric motor and cover according to the present invention with a pump which is driven by the motor.

Referring now to the drawings and in particular to FIG. 1, a dynamoelectric machine according to the present invention is indicated generally at 10. The machine 10 includes a cover 12 which is removably mounted and which provides an effective seal against contamination while simultaneously providing unhindered access to fasteners 14 for connecting the machine to an adjacent part.

In one embodiment, the machine 10 is an electric motor that is particularly suited for use in applications where it is exposed to moisture, dust, or other environmental contamination of foreign particles. Specifically, the motor 10 is intended for assembly with a filter pump 16 to drive the pump in circulating and filtering water of an above-ground swimming pool. Although the description herein is primarily with reference to that embodiment, it is understood that other dynamoelectric machines, such as electric motors or generators for other applications or fields of industry, do not depart from the scope of this invention.

The motor 10 includes a casing 18 having a hollow interior which defines a housing for the motor. The casing 18 is generally cylindric in shape and has a central longitudinal axis A. A stationary assembly, or stator (not shown), and a rotatable assembly, or rotor (not shown) are both positioned within the interior of the motor casing 18. As known to those skilled in the art, the stator is generally annular and holds one or more wire-wound coils, or windings. When energized with electrical current, the windings magnetically interact with the rotor to produce torque. The torque is transmitted to a driven machine, such as the pump 16.

A front endshield 20 and a back endshield 22 (FIG. 1) define opposite longitudinal ends of the casing 18. Each endshield has an inner side 24 which faces inward toward the casing 18 and an outer side 26 which faces outward away from the casing. Each endshield 20, 22 has a generally circular outer shape corresponding to the casing. A bearing hub 28 on each endshield forms a cavity for receiving a corresponding bearing mounting a rotor shaft (not shown) which extends between the endshields and is coaxial with the longitudinal axis A of the casing. Each bearing hub 28 is positioned on an inner side 24 of the respective endshield, such that the outer side 26 is free from a hub and the associated volume required for a bearing. That provides space along the outer side 26 available for other components, as described below.

The endshields 20, 22 are connected by several (e.g., four) circumferentially-spaced, elongate threaded fasteners 14 (FIG. 1) which extend through the casing 18 and are received through corresponding openings 30 of each endshield. Referring to the front endshield 20, the openings 30 are located generally in an outer peripheral margin of the endshield and define fastening locations where heads 32 of the fasteners 14 engage the endshield. The fasteners 14 are each sized to have a length that exceeds the spacing between the endshields 20, 22. As a result, the fasteners 14 extend beyond the casing 18 for connecting the motor 10 to an adjacent part, such as the filter pump 16, another machine, or a motor supporting structure. Vent openings 34 in the casing 18 and front endshield 20 circulate air to cool the motor. The vent openings 34 are positioned in a vertically lower portion of the motor to inhibit entry of rain water into the openings.

Figure 5:
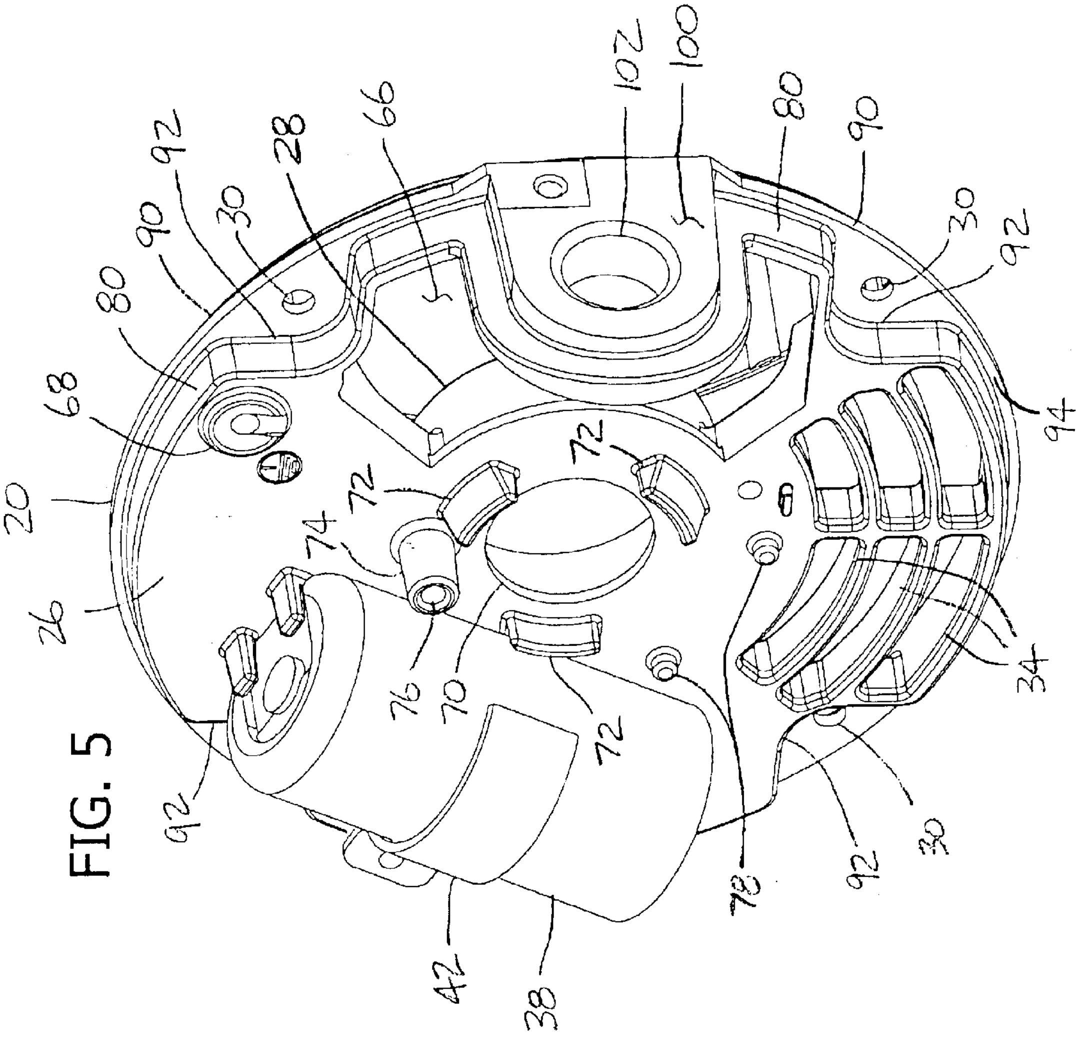
FIG. 5 is a perspective of the endshield.
Figure 6:
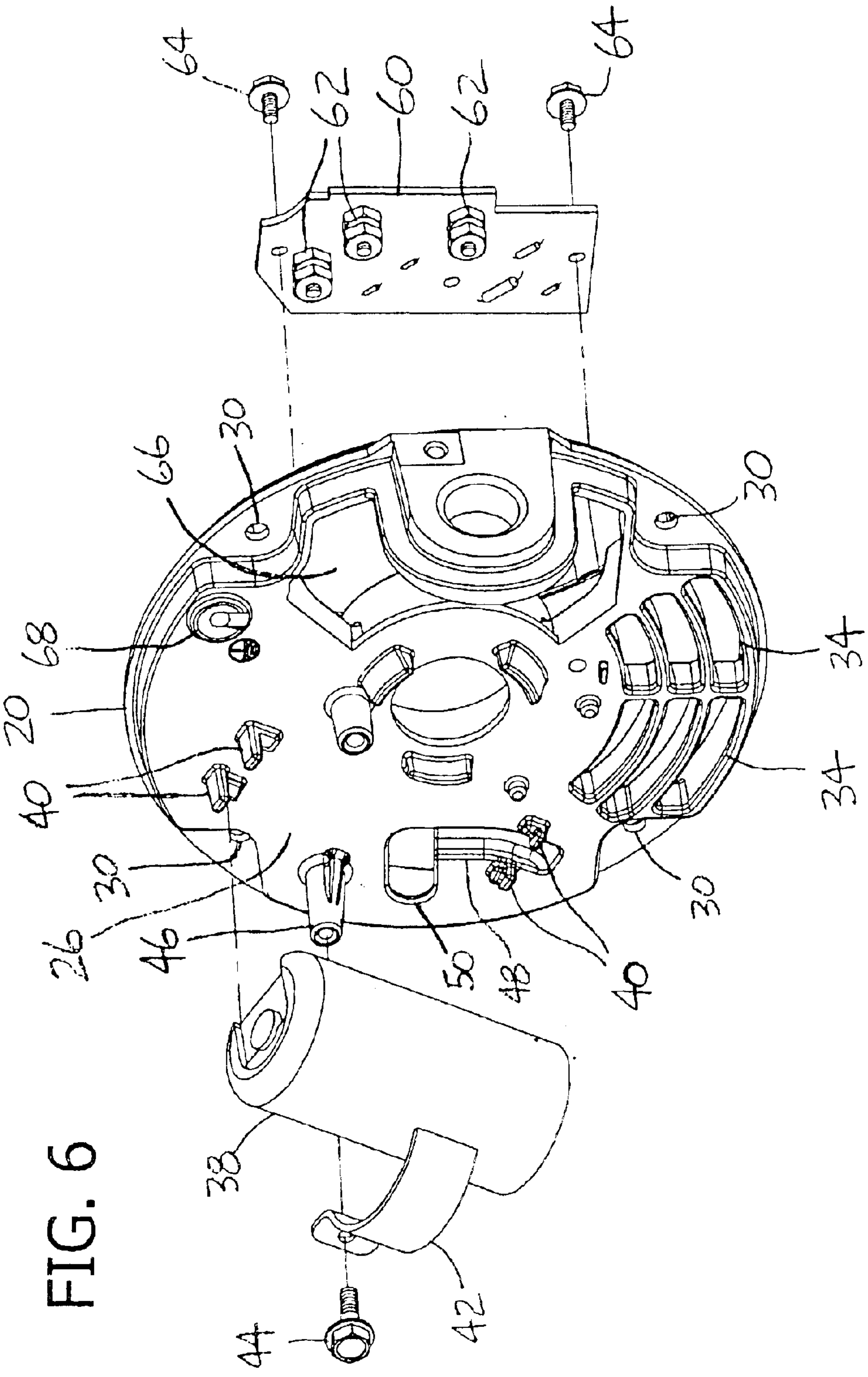
FIG. 6 is a schematic exploded view of electronic components and the endshield.

Referring to FIGS. 5 and 6, the front endshield 20 mounts electrical components used in control or operation of the motor 10. In one embodiment, a capacitor 38, such as a starting capacitor which stores energy for starting the motor, is placed between four mounting formations 40 on the outer side 26 of the endshield. A bracket 42 holds the capacitor 38 in position, the bracket being connected to the endshield 20 by a fastener 44 received in a boss 46 projecting out from the outer side 26 of the endshield. A channel 48 and opening 50 in the endshield under the capacitor 38 accommodate a capacitor wire (not shown). A terminal board 60 holds electrical components including terminals 62 for connecting wires of a power cord (not shown) to supply electrical energy to the motor 10. The terminal board 60 is mounted to the inner side 24 of the endshield 20 by two fasteners 64 (FIG. 6) received in corresponding threaded holes (not shown) on the inner side. An access opening 66 extends through the endshield for accessing the terminal board 60 from the outer side 26 of the endshield. Other components, including additional components which would be damaged by moisture or other contamination, may be mounted on the endshield 20.

The outer side 26 of the endshield also includes a ground wire port 68 (FIG. 5), a central opening 70 for receiving an end of the rotor shaft, and three arcuate formations 72 around the opening which are used for holding the endshield 20 during its manufacture. A boss 74 projects from the outer side and has a hole 76 for receiving a screw 77 (FIG. 1) to attach the cover 12 to the endshield 20. Two tool guides 78 (FIG. 5) are provided for limiting motion of a tool (not shown) which is slidable along the outer side 26 when the cover 12 is in place to hold the end of the rotor shaft and prevent its rotation, such as when installing an impeller on an opposite end of the rotor shaft.

Figure 3:
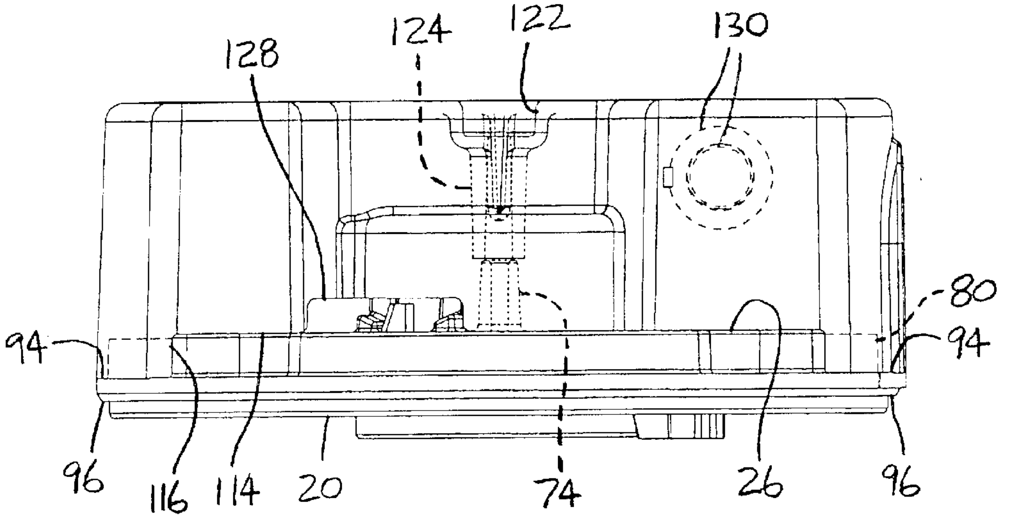
FIG. 3 is an elevation of the cover and endshield.
Figure 4:
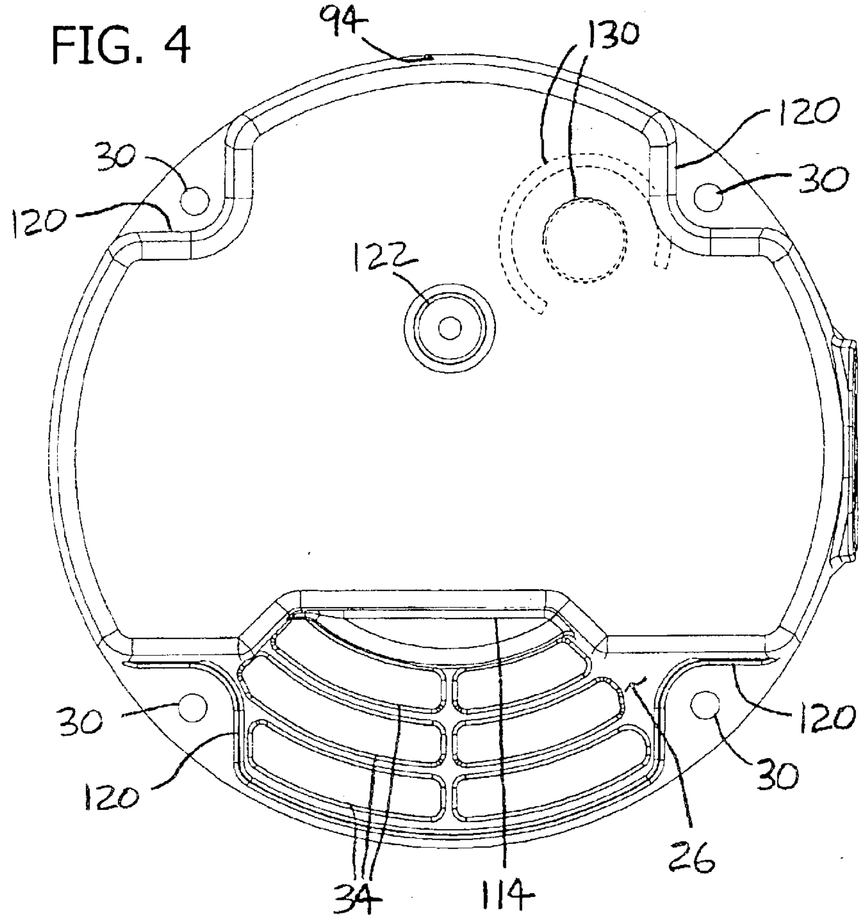
FIG. 4 is a bottom plan of the cover and endshield.

A wall 80 and an outer rim 90 (or ledge) extend around an outer peripheral margin of the endshield 20 to facilitate assembly and sealing of the cover 12 to endshield 20. The wall 80 comprises an outer sidewall which has a generally circular path around the endshield 20 and projects in the longitudinal direction. The wall 80 guides, aligns and stabilizes placement of the cover 12 on the endshield. The wall 80 has four recesses 92, each of which comprises a deviation from the circular path. Each recess 92 corresponds with a respective fastener opening 30. The outer rim 90 projects radially outward from the wall 80 and defines a continuous shoulder around the periphery of the endshield 20. The rim 90 has a flat surface 94 (FIGS. 3-5) on its outer side which lies generally within a radial plane and is configured for engagement by the cover 12. On its opposite, inner side, the rim 90 has a perpendicular surface 96, as shown in FIG. 3, which is engageable with the casing 18.

An arch-shaped formation 100 is located along the outer periphery of the endshield 20, generally adjacent the access opening 66 at the terminal board 60. The formation 100 projects from the outer side 26 in the outboard longitudinal direction, or away from the casing 18. It has an opening 102 for receiving an electrical cord (not shown) therethrough which is routed through the access opening 66 toward the terminal board 60. The opening 102 may be threaded to accommodate an externally threaded conduit containing the power cord. The wall 80 and the rim 90 follow a path extending around the formation 100 in a continuous manner.

Figure 2:
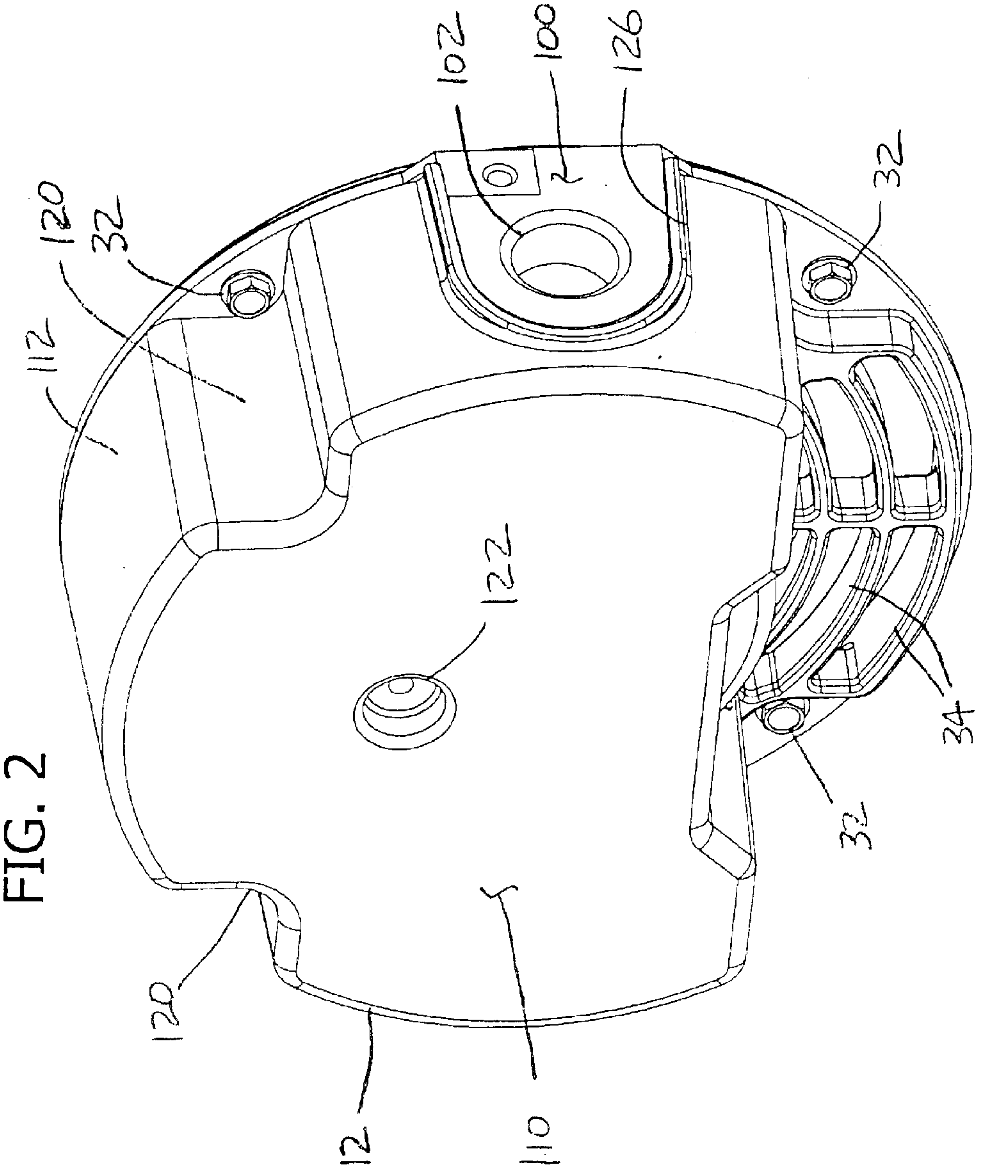
FIG. 2 is a perspective of the cover mounted on an endshield of the motor.

The cover 12 is removably mounted on the endshield 20 and defines an enclosure to protect the electrical components, including the terminal board 60 and capacitor 38. In one embodiment, the cover has a flat end wall 110 (FIG. 2) and a peripheral skirt 112 which form a dome covering the endshield 20. The cover 12 is configured for a telescoping, overlapping, and sealing fit with portions of the wall 80 to prevent passage of moisture or contaminants into the enclosure. The cover is shaped and sized to readily slide in a longitudinal direction, parallel with the axis A, along the wall 80 and rest against the rim 90. The overlapping telescoping fit extends along at least a vertically upper portion of the wall 80 for protection from rain. As shown in FIG. 2, the cover 12 leaves a lower portion of the endshield 20 (generally at the vent openings 34) uncovered so that air circulation is not impeded. The cover does not overlap the wall 80 along a lower edge 114 (FIGS. 3 and 4) of the cover. The lower edge 114 engages the outer side 26 of the endshield, and does not engage the rim 90. A notch 116 in the lower edge 114 allows the lower edge of the cover to bridge over the wall 80 and along the outer side 26. The cover 12 is formed of a suitable rigid and lightweight material, such as a molded plastic or drawn sheet steel. It is understood that the cover may be configured to overlap a larger or smaller portion of the wall 80 without departing from the scope of this invention.

The cover 12 has indentations 120 to avoid covering fastener openings 30 when mounted on the endshield 20 such that all fastener locations lie outside of the enclosure. Thus, the fasteners 14 remain accessible for connecting the motor 10 to the pump 16. In one embodiment (FIG. 4), there are two indentations 120 located at a respective two of the openings 30 (the upper two openings) so that the cover 12 does not enclose nor obstruct access to the fastener locations when mounted on the endshield. The indentations 120 extend in the longitudinal direction along an entire longitudinal extent of the cover, so that there is unhindered access for installing or removing the fasteners 14. The indentations 120 are shaped to correspond with the recesses 92 in the wall 80 to maintain the overlapping fit at the indentations. It is noted that the availability of free volume inside the enclosure is tightly limited. For motors of the prior art, space constraints would not permit inclusion of indentations 120 because they reduce internal volume. But because the bearing hub 28 in the present invention is on the inner side 24 of the endshield 20, that permits the capacitor 38 to be positioned relatively closer to the central opening 70 so that indentations are feasible. Covers of other shapes and configurations do not depart from the scope of this invention.

A hole 122 positioned generally at a center of the end wall 110 of the cover 12 and a corresponding stem 124 (FIG. 3) are configured to align with the boss 74 of the endshield and receive the screw 77. That screw 77 is the only fastener necessary to securely hold the cover 12 in position on the endshield 20, as the stability of the cover is enhanced by its overlapping fit with the wall 80. The cover 12 has an arch-shaped opening 126 for engaging the corresponding formation 100 of the endshield. Thus, the cover provides an overlapping sealing fit against the formation 100. The cover 12 also includes an opening 128 (FIG. 3) for permitting insertion of the previously mentioned tool into the enclosure to access and hold the end of the rotor shaft. Weakened areas 130 (FIGS. 3 and 4) are provided on the cover 12 for optionally punching out an opening in the cover to mount a control component (not shown), if necessary, in the skirt 112 or end 110. For example, a pneumatic switch, electrical switch, or timer may be located inside the enclosure of the cover for use in controlling a pump of a jetted bathtub or residential pool. These control components could be inadvertently damaged when the cover is removed or re-installed. Therefore, the present invention prevents damage by its ability to connect the motor 10 to the pump 16 without removing the cover 12.

Because it has an effective seal against the front endshield 20, the cover 12 is the only cover protecting the electrical components 38, 60. Accordingly, the machine is free from any secondary cover and, within the enclosure, the electrical components are uncovered and openly exposed. That provides an advantage by reducing time necessary to access electrical components.

Thus, the motor 10 of the present invention simultaneously provides access to bolts 14 for connection to an adjacent pump 16 and protection from contamination. The cover 12 does not need to be removed to manipulate the fasteners 14 in assembling the motor and pump, thereby reducing time and precluding possible damage. The cover is attached to the endshield with a single fastener 77, and it avoids the need for any secondary cover or additional fasteners to access electrical components and connections.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A dynamoelectric machine which is connectable to an adjacent part while being simultaneously protected from moisture or contaminants, the machine comprising:

a casing having a hollow interior defining a housing and a longitudinal axis;

an endshield positioned generally at an end of the casing and mounting at least one electrical component used in operation of the machine, the endshield having a wall projecting in a longitudinal direction and further having at least two openings for receiving fasteners to connect the machine to said adjacent part, the at least two openings defining respective fastening locations on the endshield; and a cover removably mounted on the endshield and defining an enclosure to protect said at least one electrical component, the cover being configured for an overlapping fit with at least a portion of the wall of the endshield to prevent passage of moisture or contaminants into the enclosure;

wherein the cover is further configured to avoid covering said at least two openings when mounted on the endshield such that said fastener locations lie outside of the enclosure and are accessible for connecting the machine to said adjacent part while the cover remains mounted on the endshield.

2. A dynamoelectric machine as set forth in claim 1 wherein said cover is the only cover protecting said at least one electrical component, the machine being free from any secondary cover such that, within said enclosure, the at least one electrical component is uncovered and openly exposed.

3. A dynamoelectric machine as set forth in claim 2 wherein the cover further comprises a longitudinal indentation positioned so that when the cover is mounted on the endshield, the indentation is at one of said at least two openings to avoid covering said opening.

4. A dynamoelectric machine as set forth in claim 3 wherein the wall of the endshield has a recess corresponding with said indentation in the cover whereby the cover maintains said overlapping fit with said wall at said indentation.

5. A dynamoelectric machine as set forth in claim 4 wherein said endshield further comprises an outer rim projecting generally radially outward from the wall and defining a continuous shoulder around the wall engageable by the cover when mounted on the endshield.

6. A dynamoelectric machine as set forth in claim 5 further comprising a bearing hub located on an inner side of the endshield.

7. A dynamoelectric machine as set forth in claim 5 wherein the endshield has four openings positioned generally at an outer peripheral margin of the endshield.

8. A dynamoelectric machine as set forth in claim 7 wherein the cover has two indentations corresponding to two of said four openings, and the wall of the endshield has two corresponding recesses.

9. A dynamoelectric machine as set forth in claim 1 further comprising said fasteners for connecting the machine to said adjacent part, each fastener comprising an elongate threaded fastener having a head for engaging the endshield at a respective recess.

10. A dynamoelectric machine as set forth in claim 1 wherein the endshield further comprises an arch-shaped formation projecting in the longitudinal direction with an opening therein for passage of an electrical cord therethrough.

11. A dynamoelectric machine as set forth in claim 10 wherein the wall and rim extend around the arch-shaped formation.

12. A dynamoelectric machine as set forth in claim 1 wherein the wall is an outer sidewall extending around the endshield at a peripheral margin of the endshield.

13. A dynamoelectric machine as set forth in claim 1 wherein the cover comprises a flat end wall and a skirt, the skirt having a shape corresponding with said portion of the wall to provide for said overlapping fit.

14. A dynamoelectric machine as set forth in claim 1 wherein said portion of the wall is a vertically upper portion.

15. A dynamoelectric machine as set forth in claim 1 further comprising a fastener attaching the cover to the endshield, and wherein said fastener is the only fastener which must be removed to access said at least one electrical component.

16. A dynamoelectric machine as set forth in claim 15 further comprising a boss on the endshield and a stem on the cover which align for receiving said fastener to attach the cover to the endshield.

17. A method of protecting a dynamoelectric machine from moisture or contaminants while connecting the machine to an adjacent part, the machine having a casing, two opposite endshields, and at least two fasteners connecting the endshields and extending beyond the casing for connection to said adjacent part, the method comprising the steps of:

mounting a cover on a portion of one of said endshields with a fit which overlaps a sidewall of the endshield to prevent passage of moisture or contaminants, the cover being configured to avoid covering said fasteners; and manipulating the fasteners to connect the machine to said adjacent part while the cover remains mounted on the endshield.

* * * * *